Figure 1:
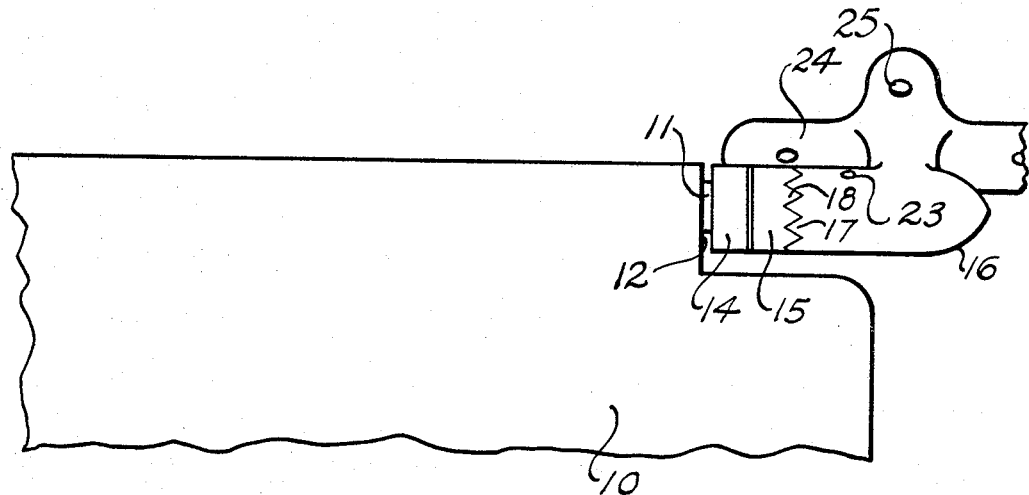

July 11, 1967  R. H. CADLE  3,330,594
RIGIDLY ADJUSTABLE SUN SHADE OR THE LIKE
Filed Dec. 28, 1964

INVENTOR
REESE H. CADLE
BY
R. Wilson Corder
ATTORNEY

United States Patent Office 3,330,594
Patented July 11, 1967

3,330,594
RIGIDLY ADJUSTABLE SUN SHADE OR THE LIKE
Reese H. Cadle, Baxley, Ga., assignor of one-half to George Marshall Thomas and Anthony Bartholomew Askew, both of Atlanta, Ga.
Filed Dec. 28, 1964, Ser. No. 421,436
5 Claims. (Cl. 296—97)

This invention relates to the automotive industry, more particularly, to a new and improved sun visor to be mounted in the interior of a vehicle adjacent the windshield and above the driver's seat. These devices are usually pivoted against the top of the car so as to normally be out of the way, but may be quickly turned downwardly to prevent glare, as from the sun or an approaching vehicle's headlights when the occasion demands.

In mounting these accessories it has been the custom for many years to employ a rod rigidly mounted to the body of the visor, which rod is rotatably secured in a fixed hollow mounting member secured near the top of the windshield, or elsewhere in that locality as convenient. Said rod is normally secured by a set screw operating in the hollow member.

However, while this arrangement may be reasonably satisfactory in a new vehicle, wear occurs at the operative end of the set screw and in the rod at the point of engagement with the result that the visor becomes increasingly sloppy in its mounting, and upon occasion may even flop into operative position when not desired, which is an annoyance, and even potentially dangerous. Tightening of the set screw remedies this situation temporarily, but sooner or later the situation may become permanently out of hand.

An object of this invention is to provide a visor which once adjusted remains permanently in position, yet may be further adjusted by a simple manipulation of the visor, after which it again assumes permanency of posture.

Another object is to provide such a device that is semi-automatic in its action.

Another object is to provide simplicity in such a sun visor.

A still further object is to provide such a device that will normally outlast the vehicle to which it is attached, operating in a thoroughly efficient manner and without adjusting during such period.

Another object is to provide and make possible economy of manufacture.

Another object is to make possible a pleasing appearance in a device of the instant type.

Figure 2:
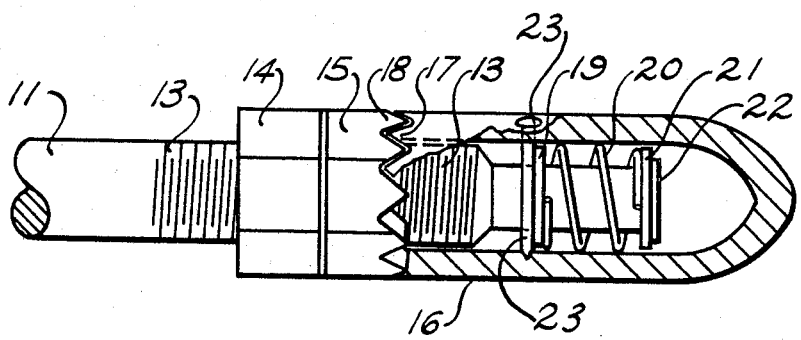

These and other objects made apparent during the further progress of this specification are accomplished by means of subject invention, a full and complete understanding of which is facilitated by reference to the drawing herein, in which:

FIG. 1 is a front view, fragmentary in part, showing the instant device in operative position; and FIG. 2 is an enlarged view, partially in vertical cross-section showing in detail the inner mechanism of said visor.

Referring now to the drawing, in which like numerals indicate corresponding parts or elements throughout, 10 indicates the main body member of an automobile sun visor or the like, which element may be opaque or semi-opaque, and of suitable area and expanse to accomplish its desired function.

A visor shaft or rod 11 is fixably mounted in the upper portion of 10 as at 12. Said rod is threaded as at 13 to receive a lock-nut 14 and a gear nut 15.

Attention is now directed to mounting or housing member 16, which consists of a hollow element in which operates rod 11, said element being provided at its outer or open edge with a plurality of serrations 17 of a contour complementary to the teeth 18 of gear nut 15 with which they cooperate. A washer 19 is mounted on shaft 11 against the tension of a coil spring 20, held in position by a second washer 21 and tension spring brad 22. Retainer pins 23 retain assembly 19–22 in operative position with lock-nut 14 and gear nut 15 so adjusted that the teeth 18 and the serrations 17, snugly interlock under tension.

In operation the visor works as follows: When in normal or lock position the device is held in its mounting in a nonslip and nonrattle position. When it is desired to change this adjustment, however, as by bringing the visor downwardly into operative position adjacent the windshield, it is only necessary to grasp 10 in one hand and urge the visor laterally to the left, which in turn causes rod 11 and gear nut 15 to move out of locked position with the serrations 17 of housing 16, this being accomplished against the tension of spring 20. At this point the visor may now be rotated downwardly (or even upwardly) as desired. When the proper position has thus been obtained, release of the visor causes such to snap sharply into locked engagement with mounting 16, particularly with reference to elements 18 and 17 where the visor remains until further manipulation may be desired.

A securing element 24 may be formed integral with 16, said element having apertures 25 through which may be passed suitable screws or other suitable anchoring members for holding housing 16 and its associated elements firmly in place.

While there has been described in considerable detail herein one form of the instant invention no limitation is intended or implied thereby, but on the contrary, the appended claims are to be accorded a construction and scope fully in keeping with the contribution to the art.

I claim:

1. In a device of the character described, in combination, a visor, a rod fixedly mounted adjacent the top thereof, said rod being threaded in its intermediate portion and tapered to a smaller diameter at the end opposite to that which engages the visor, a lock-nut on said rod, a nut having serrations on one side positioned on the rod adjacent said lock-nut, a hollow mounting member having serrations formed in one end thereof, said serrations of said mounting member engaging said serrations of said nut, a washer positioned on the small end of said rod slidable relative to the rod, retainer pins anchored to said mounting member holding said washer in position on the rod, a second washer near the end of the rod, a retainer brad holding said washer in place on the rod, a coil spring positioned on said rod interposed between said two washers, and a securing element formed integral with said mounting member for anchoring the assembly in the interior of an automobile.

2. In a device of the character described, in combination, a visor, a rod fixedly mounted adjacent the top thereof, said rod being threaded in its intermediate portion and tapered to a smaller diameter at the end opposite to that which engages the visor, a lock-nut on said rod, a nut having serrations on one side positioned on the rod adjacent said lock-nut, a hollow mounting member having serrations formed in one end thereof, said serrations engaging the serrations of said nut, a washer positioned on the small end of said rod slidable relative to said rod, retainer pins anchored to said mounting member holding said washer in position on the rod, a coil spring positioned on said rod adjacent said washer, means near the end of the rod for holding said spring in place on the rod, and a securing element formed integral with said mounting member.

3. A rigidly adjustable sun shade comprising:
(a) a visor having a rod fixedly mounted adjacent one edge thereof, said rod being threaded in its intermediate portion and having one end which extends beyond the periphery of said visor;
(b) a lock nut threadedly received and positionable along said rod;
(c) a nut having serrations on one side positioned on said rod adjacent said lock nut;
(d) a hollow mounting member positioned over said one end of said rod, said mounting member having serrations formed in one end thereof, said serrations engaging the serrations of said nut; and
(e) means within said mounting member for biasing said serrated nut against said serrated mounting member.

4. A rigidly adjustable sun shade as recited in claim 3 wherein said biasing means comprises:
(a) a spring positioned on said rod within said mounting member;
(b) means for retaining said spring on said rod; and
(c) means, fixedly attached to said mounting member, for maintaining said spring in a compressed position thus biasing said serrated nut against said serrated mounting member and for compressing said spring further when said rod is moved laterally.

5. A rigidly adjustable sun shade or the like comprising:
(a) a visor having a rod fixedly mounted adjacent one edge thereof, said rod being threaded in its intermediate portion and tapered to a smaller diameter at the end opposite that which engages said visor;
(b) a lock-nut threadedly received on said rod for threaded repositioning along said rod;
(c) a nut having serrations on one side positioned on said rod adjacent said lock-nut;
(d) a hollow mounting member positioned over said tapered end of said rod, said mounting member having serrations formed in one end thereof, said serrations engaging the serrations of said nut;
(e) a washer positioned within said hollow mounting member and on said tapered end of said rod slidable relative to said rod;
(f) a retainer pin, anchored to said mounting member, holding said washer in position on said rod;
(g) a second washer near said tapered end of said rod;
(h) a retainer brad holding said second washer in place on said rod;
(i) a coil spring positioned on said rod interposed between said two washers; and
(j) a securing element formed integrally with said mounting member for anchoring said sun shade to the interior of an automobile.

References Cited
UNITED STATES PATENTS

| | | | |
|---|---|---|---|
| 1,445,918 | 2/1923 | Sterling | 296—97 X |
| 1,457,929 | 6/1923 | Lippy | 287—14 X |

BENJAMIN HERSH, *Primary Examiner.*

J. A. PEKAR, *Assistant Examiner.*